April 9, 1929.   C. I. HALL   1,708,789

COMBINED RELAY AND INDICATOR

Filed Feb. 21, 1924

Inventor:
Chester I. Hall,
by *Alexander S. Lintz*
His Attorney.

Patented Apr. 9, 1929.

1,708,789

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

COMBINED RELAY AND INDICATOR.

Application filed February 21, 1924. Serial No. 694,448.

My invention relates to protective devices, and has for one of its objects the provision of an improved device capable of functioning both as an ammeter to indicate the value of the current in an electric circuit and as a relay to control the circuit connections. A further object is to provide an improved combined thermal and electromagnetic over-current relay operable to interrupt an electric circuit at the termination of a period of time the length of which is inversely proportional to the value of the current transmitted therethrough and is dependent upon the direction in which this current is transmitted.

Where a number of protective and indicating functions are required to be performed in connection with the operation of a power system it is frequently desirable to arrange a single device to perform the functions which are commonly performed by a plurality of devices. Thus, in a power system comprising an engine driven generator and a battery, for example, it is necessary to provide on the battery charging panel a reverse current cutout, an inverse-time, over-current relay and an ammeter. The reverse current cutout is required to prevent continuous discharge of the battery to the generator which is operated as a motor to crank its driving engine at starting, the inverse time limit relay is arranged to open the generator load circuit in response to overload, and the ammeter is used to indicate the value of the current in the circuit interconnecting the generator and the battery. In accordance with my invention these three instruments are replaced by a single device capable of performing all three functions and of independent calibration with respect to each function which it performs.

My invention will be better understood by reference to the following description when considered in connection with the accompanying drawing and its scope will be pointed out in the appended claims.

Figure 1:
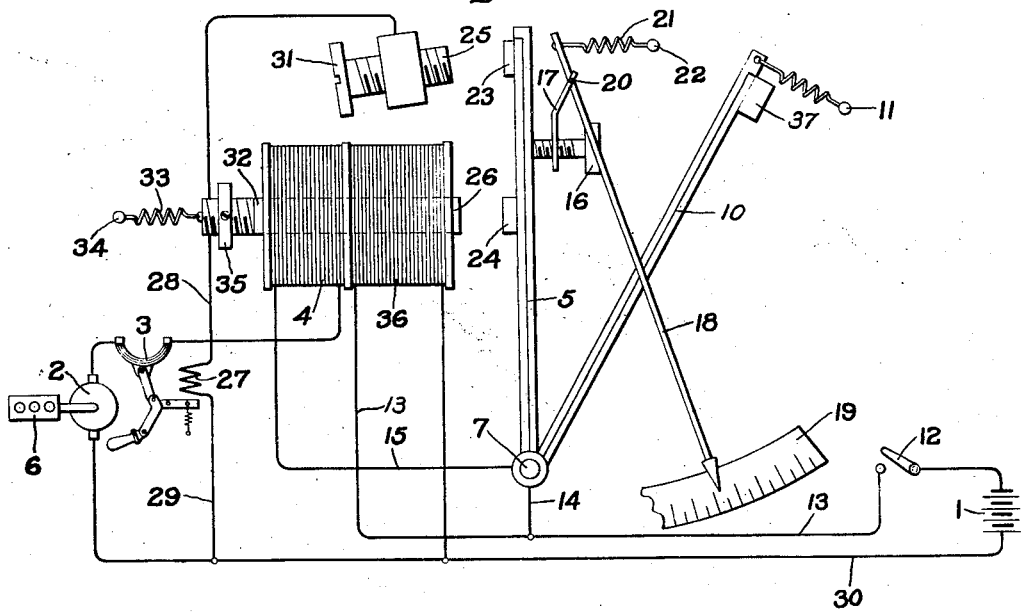
Figure 2:
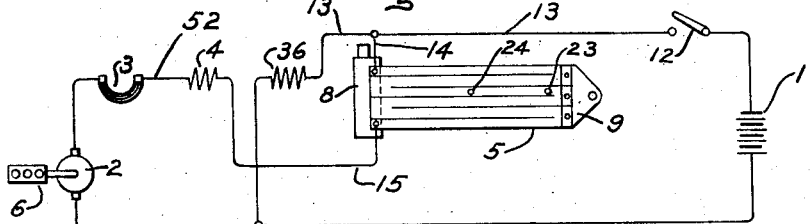
Figure 3:
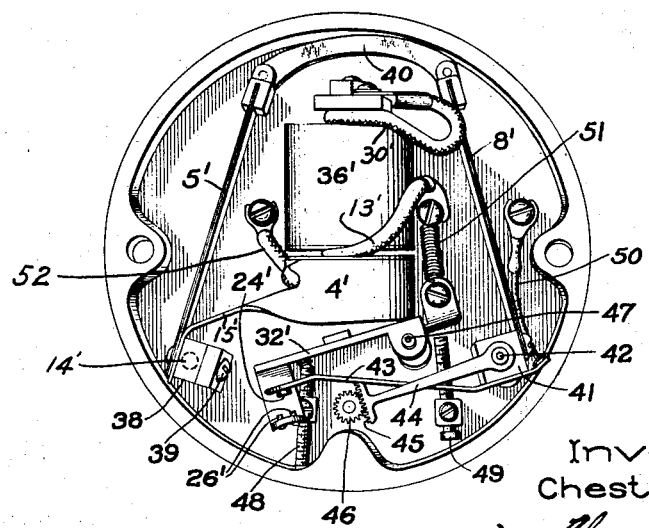

Referring to the drawing, Fig. 1 is a diagrammatic showing of a battery charging system in which my invention has been embodied, Fig. 2 shows the form of a thermostatic element used in my device; and Fig. 3 shows a further modification of the device.

Fig. 1 shows a battery 1 arranged to be connected to a generator 2 through circuit breaker 3, series coil 4 and a composite bar of thermostatic metal 5. The generator 2 is illustrated as driven by an internal combustion engine 6. The bar 5 is pivoted at the point 7 and is slotted from each end as indicated in Fig. 2 to increase the length of the path which current must follow in passing between the conductors 14 and 15. At the two ends of the slotted bar 5 are provided insulating members 8 and 9 for maintaining all parts of the bar in proper alinement. A manually operated switch 12 is provided for interrupting the circuit through which the battery 1 is interconnected with the generator 2. The bar 5 at one of its terminals is connected to the switch 12 through conductors 13 and 14 and at the other terminal is connected to the series coil 4 through conductor 15. Operatively associated with the bar 5 through an adjusting screw 16 and a link 17 is a pointer 18 arranged at its lower end to move along the scale 19. The pointer 18 is fixed to the member 17, is pivoted at the point 20 and at its upper end is attached to one end of the spring 21 which has its other end fixed at the point 22. The bar 5 is shown as provided with contacts 23 and 24 arranged to cooperate with contacts 25 and 26 respectively. By engagement of either contacts 23 and 25 or contacts 24 and 26 in response to bowing of the thermostatic bar 5 to the left the trip coil 27 of the circuit breaker 3 is connected across the battery 1 through switch 12, conductors 13 and 14, bar 5 and conductors 28, 29, and 30. A screw 31 is provided for adjusting the spacing between the contacts 23 and 25. The plunger or armature 32 upon one end of which is carried the contact 26 is biased to its left-hand position by means of a spring 33 fixed at the point 34 and is provided with an adjustable stop 35 for limiting its travel in a right-hand direction. A shunt coil 36 shown as permanently connected between the leads 13 and 30 is provided for controlling the position of the plunger 32 in a manner hereinafter explained.

When the generator 2 is started as a motor to crank the engine 6 the ampere turns of the series coil 4 and shunt coil 36 are additive and the armature 32 is moved to its right-hand position against the tension of the spring 33. The spacing of contacts 24 and 26 is therefore reduced and, due to the heating effect of the current, the bar 5 is bowed to the left and these contacts are brought together after an interval of time predetermined by the setting of the stop 35. If the engine does not start during this interval the circuit of the trip coil 27 will be closed and the circuit interconnecting the battery and generator will be opened. Due to interruption of this circuit the current traversing the bar 5 is interrupted and the circuit of the trip coil 27 is opened by action of the spring 33 which moves the plunger 32 to its left-hand positon. It will be apparent that, when thus used as reverse current cut-out, the device has an inverse time characteristic or, in other words, operates at the termination of a period of time the length of which is inversely proportional to the value of the current traversing the circuit. This feature is desirable since the battery should remain in the circuit for a time inversely proportional to its rate of discharge.

If the engine picks up as it should and the generator 2 supplies current to the battery 1 the current of the series coil 4 is reversed and the fluxes in the coils 4 and 36 tend to neutralize each other. The armature 32 is therefore moved to its illustrated position by the spring 33 and the device is in condition to operate as an overload relay. In the illustrated position of the contact 26 the spacing of the contacts 23 and 25 is less than that of the contacts 24 and 26 when the bar 5 is bowed to the left as a result of the heating effect of the current which it carries. With normal load current through the bar 5, however, the contacts 23 and 25 will be out of engagement with each other. On overloads below a certain value the time required for closure of the contacts 23 and 25 is inversely proportional to the value of the current in the bar 5. Upon greater increase in the current value, the flux set up by the series winding 4 is sufficient to more than neutralize that of the winding 36 and the armature 32 is moved to its right-hand position bringing the contact 26 into engagement with the contact 24, when the bar 5 has been bowed to the left a sufficient distance, thereby energizing the trip coil 27. The particular value of current at which this occurs is determined by the relation between the tension of the spring 33 and the value of the resultant flux through coils 4 and 36. Due to the characteristics of the thermostatic metal used in the bar 5 an inverse time relation which is particularly desirable for the protection of both the generator and battery is obtained both at starting and during overloads. Due to the time lag introduced by the thermostatic metal construction the device functions as a heavily damped ammeter, the pointer 18 having its lower end moved along the scale 19 in response to movement of the bar 5. As a heavily damped ammeter the device indicates not instantaneous but average values of current.

Fixed to and insulated from the bar 5 is a similar bar 10 which is provided to compensate for the effect on bar 5 of changes in the temperature of the atmosphere. The bar 10 carries no current and for that reason need not be slotted. A spring fixed at the point 11 is provided for holding the bar 10 against the stop 37. The bars 5 and 10 are so arranged as to be bowed in opposite directions by changes in the temperature of the atmosphere and, since the bar 10 is held against movement at its upper end and is fixed to the bar 5 at its lower end, the bar 5 will be maintained in a position which is independent of any change in temperature to which both bars are subjected.

Fig. 3 shows the device as modified for enclosure in a case, the front or face of which has been removed to show the relation of the various parts. In this figure primed numbers are used to designate parts indicated in Fig. 1 by the same unprimed numbers. In this modification the bar 5' is fixed at its lower end to an insulation block 38 by means of a screw 39 and at its upper end is insulated from and attached to the bar 8' by means of a yoke 40. At its lower end the bar 8' is fixed to an insulating block 41 pivoted at the point 42 about which it is rocked by the combined action of the bars 5' and 8'. Also fixed to the insulating block 41 is a member 43 adapted to move the contact 24' and an arm 44 supporting upon its end a gear segment 45 arranged to mesh with the pinion 46 through which movement of the indicating pointer is effected. As indicated in the figure the bar 5' is connected in series with a coil 4' through leads 15' and 52. The coil 4' is arranged to cooperate with a shunt coil 36' in producing flux for controlling the operation of the armature 32' which is biased to its down position by a spring 51. The terminals of the coil 36' are indicated by reference numerals 13' and 30'. Armature 32 is pivoted at the point 47 and carries a contact 26' arranged to cooperate with the contact 24'. Adjustable stops 48 and 49 are provided for limiting the movement of the armature 32'. A lead 50 arranged to be connected in the trip coil circuit of the switch 3 is connected to the right-hand end of the member 43. The single pair of contacts 24'—26' perform the same functions as the two pairs of contacts 24—26 and 23—25 shown in Fig. 1. In view of what has been said in connection with Fig. 1 it is believed the operation of the modification shown by Fig. 3 will be readily understood without further explanation.

I have explained my invention by illustrating and describing certain specific embodiments thereof, but it will be readily understood by those skilled in the art that the invention may be embodied in many other forms than those shown and described. I, accordingly, do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. A protective device wherein a pair of relatively movable contacts are arranged to control an electric circuit, comprising thermal means responsive to the current in said circuit for moving one of said contacts, and electromagnetic means responsive to said current for moving the other of said contacts.

2. A protective device wherein a pair of relatively movable contacts are arranged to control an electric circuit, comprising thermal means responsive to the current in said circuit for moving one of said contacts, and electromagnetic means for moving the other of said contacts when the current in said circuit reaches a predetermined value in one direction and another predetermined value in the opposite direction.

3. A protective device wherein a pair of relatively movable contacts are arranged to control an electric circuit, comprising thermal means responsive to the current in said circuit for moving one of said contacts, and electromagnetic means responsive to the current and voltage of said circuit for moving the other of said contacts when the current in said circuit reaches a predetermined value in one direction and another predetermined value in the opposite direction.

4. A protective device wherein a pair of relatively movable contacts are arranged to control an electric circuit, comprising thermal means responsive to the current in said circuit for moving one of said contacts, electromagnetic means responsive to said current for moving the other of said contacts, and a pointer actuated by said thermal means for indicating the value of current in said circuit.

5. A protective device wherein a pair of relatively movable contacts are arranged to control an electric circuit, comprising thermal means responsive to the current in said circuit for moving one of said contacts, electromagnetic means responsive to said current for moving the other of said contacts, and a second thermal means arranged to render the position of said first mentioned thermal means independent of changes in the temperature of the atmosphere.

In witness whereof, I have hereunto set my hand this 19 day of Feb., 1924.

CHESTER I. HALL.